(12) United States Patent
Lai et al.

(10) Patent No.: US 10,018,202 B1
(45) Date of Patent: Jul. 10, 2018

(54) FAN CONTROL SYSTEM

(71) Applicant: ANPEC ELECTRONICS CORPORATION, Hsinchu (TW)

(72) Inventors: Ching-Feng Lai, Taipei (TW); Yin-Kai Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/631,917

(22) Filed: Jun. 23, 2017

(30) Foreign Application Priority Data

Jan. 6, 2017 (TW) .............................. 106100455 A

(51) Int. Cl.
| | | |
|---|---|---|
| H02P 6/00 | (2016.01) |
| H02P 6/14 | (2016.01) |
| F04D 25/16 | (2006.01) |
| F04D 29/66 | (2006.01) |
| G06F 1/20 | (2006.01) |
| H02P 6/04 | (2016.01) |
| G06F 1/00 | (2006.01) |
| F04D 25/00 | (2006.01) |

(52) U.S. Cl.
CPC ......... *F04D 25/166* (2013.01); *F04D 29/661* (2013.01); *F04D 29/665* (2013.01); *G06F 1/20* (2013.01); *H02P 6/04* (2013.01); *F04D 25/00* (2013.01); *G06F 1/00* (2013.01)

(58) Field of Classification Search
CPC ..... F04D 25/166; F04D 29/661; F04D 29/665
USPC ..................................................... 318/400.01
See application file for complete search history.

(56) References Cited

FOREIGN PATENT DOCUMENTS

| | | |
|---|---|---|
| CN | 104235034 A | 12/2014 |
| TW | I327259 B | 7/2010 |
| TW | I539081 B | 6/2016 |

*Primary Examiner* — Erick Glass
(74) *Attorney, Agent, or Firm* — Li & Cai Intellectual Property (USA) Office

(57) ABSTRACT

A fan control system includes a control module, a first fan module and a second fan module. The control module provides a first control signal to the first fan module to adjust the rotation state of the first fan module. The first fan module provides a second control signal to the second fan module based on the first control signal to adjust the second fan module. The first fan module includes a first terminal and a second terminal. The second fan module includes a first terminal and a second terminal. The first terminal of the first fan module is electrically connected to the control module to receive the first control signal. The second terminal of the first fan module is electrically connected to the first terminal of the second fan module. The second terminal of the second fan module is electrically connected to a reference voltage.

12 Claims, 3 Drawing Sheets

FAN CONTROL SYSTEM

BACKGROUND

1. Technical Field

The present disclosure relates to a fan control system, and in particular, to a fan control system capable of controlling at least two fans.

2. Description of Related Art

In the computer industry, it is a common way to use multiple fans for heat dissipation. In general, a control signal of one controller is provided to a plurality of fans, but only one fan can provide a feedback signal to the controller. The other fans use the open-loop control system, such that there are no feedback signals providing to the controller. Therefore, the controller cannot detect the operation condition of the fans. If a plurality of controllers are used to connect with the fans, the cost would increase.

Therefore, providing a fan control system capable of controlling at least two fans has become an important issue in the art.

SUMMARY

In order to achieve the above purposes, the present disclosure provides a fan control system which includes a control module, a first fan module and a second fan module. The control module provides a first control signal to the first fan module to adjust a rotation state of the first fan module. The first fan module provides a second control signal to the second fan module based on the first control signal to adjust the second fan module. The first fan module includes a first terminal and a second terminal. The second fan module includes a first terminal and a second terminal. The first terminal of the first fan module is electrically connected to the control module to receive the first control signal. The second terminal of the first fan module is electrically connected to the first terminal of the second fan module. The second terminal of the second fan module is electrically connected to a reference voltage.

According to the above, the fan control system and the fan control method of the present disclosure can effectively control the first fan module and the second fan module to stop or to start to operate at the same time. The first fan module and second fan module can also have the same rotation speed. When the second fan module is in the abnormal state, the control module can immediately detect the abnormal state of the second fan module, and provides an alarm signal. Therefore, the fan system can operate simultaneously, and the cost is reduced.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the present disclosure.

DESCRIPTION OF THE EXEMPLARY EMBODIMENTS

Figure 1:
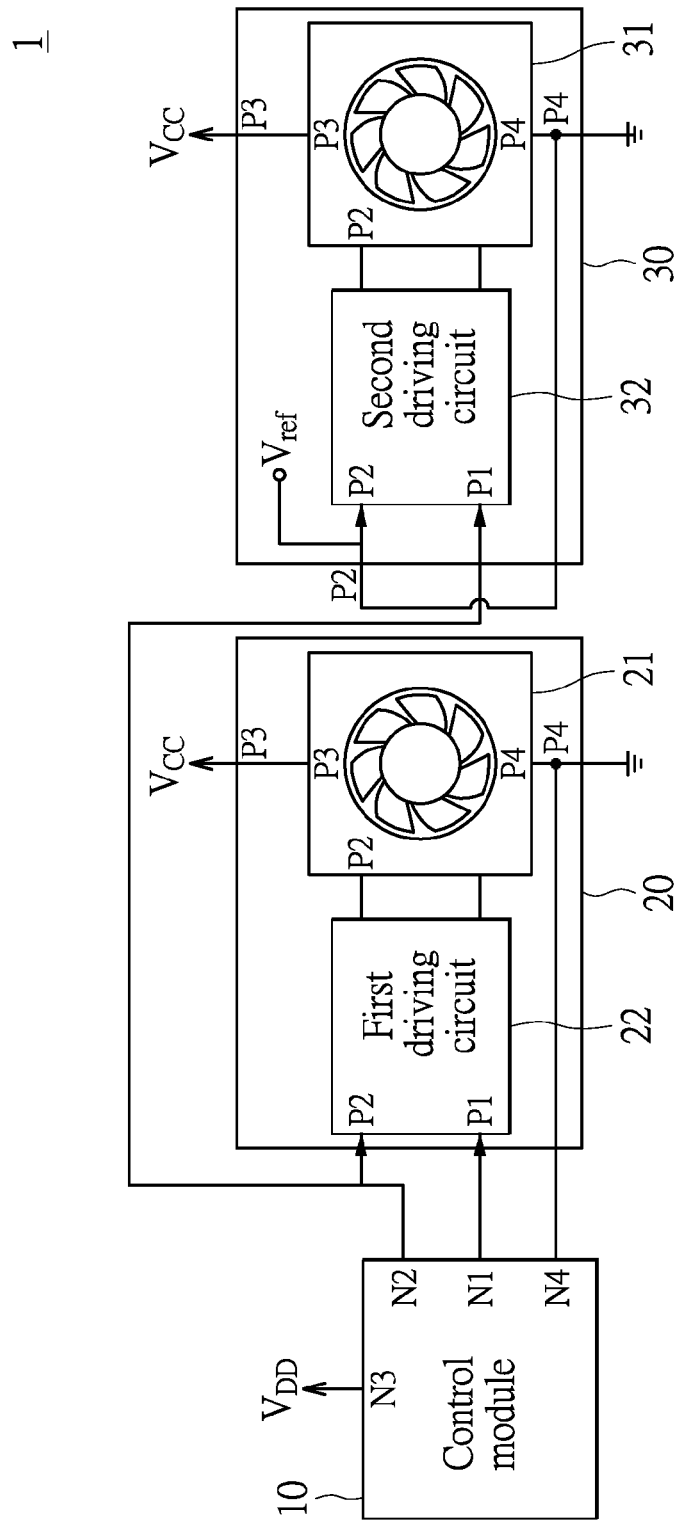
FIG. 1 is a schematic diagram of a fan control system of an embodiment of the present disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

[Embodiment of the Fan Control System]

Referring to FIG. 1, a fan control system 1 includes a control module 10, a first fan module 20 and a second fan module 30. The number of the fan modules can be adjusted according to practical requirements, and the present disclosure is not limited thereto.

In the embodiment, the control module 10 is an integrated circuit chip for controlling the first fan module 20 and the second fan module 30.

The first fan module 20 includes a first fan 21 and a first driving circuit 22. The first fan 21 is electrically connected to the first driving circuit 22. The second fan module 30 includes a second fan 31 and a second driving circuit 32. The second fan 31 is electrically connected to the second driving circuit 32.

The control module 10 includes a first terminal N1, a second terminal N2, a third terminal N3, and a fourth terminal N4. The first fan module 20 includes a first terminal P1, a second terminal P2, a third terminal P3, and a fourth terminal P4. The second fan module 30 includes a first terminal P1, a second terminal P2, a third terminal P3, and a fourth terminal P4. The first terminal P1 and the second terminal P2 of the first fan module 20 are electrically connected to the first driving circuit 22. The third terminal P3 and the fourth terminal P4 of the first fan module 20 are electrically connected to the first fan 21.

The first terminal P1 and the second terminal P2 of the second fan module 30 are electrically connected to the second driving circuit 32. The third terminal P3 and the fourth terminal P4 of the second fan module 30 are electrically connected to the second fan 31.

The first terminal N1 of the control module 10 is electrically connected to the first terminal P1 of the first fan module 20. The second terminal N2 of the control module 10 is electrically connected to a voltage source $V_{DD}$, and the fourth terminal N4 of the control module 10 is electrically connected to a ground voltage.

The control module 10 provides a first control signal to the first fan module 20 through the first terminal N1, such that a rotation state of the first fan module 20, for example starting fan, stopping fan, or fan rotation speed, is adjusted. In the embodiment, the first control signal is a pulse width modulation signal (PWM). In addition, the control module 10 detects the rotation state of the first fan module 20 through the second terminal N2 of the control module 10. In the embodiment, the rotation state includes starting fan, stopping fan, fan rotation speed, and an abnormal state.

The first terminal P1 of the first fan module 20 is electrically connected to the first terminal N1 of the control module 10. The second terminal P2 of the first fan module 20 is electrically connected to the second terminal N2 of the control module 10. The third terminal P3 of the first fan module 20 is electrically connected to a reference voltage source $V_{CC}$. The fourth terminal P4 is electrically connected to a ground voltage.

The first terminal P1 of the second fan module 30 is electrically connected to the second terminal P2 of the first fan module 20. The second terminal P2 of the second fan module 30 is electrically connected to a reference voltage Vref. The third terminal P3 of the second fan module 30 is electrically connected to the reference voltage source $V_{CC}$. The fourth terminal P4 of the second fan module 30 is electrically connected to the ground voltage. In the embodiment, the reference voltage Vref is a ground voltage, and the second terminal P2 of the second fan module 30 is electrically connected to the fourth terminal P4 of the second fan module 30.

In the embodiment, the first driving circuit 22 detects the connection state of the second terminal P2 of the first fan module 20 to determine whether the first fan module 20 is in a master state or in a slave state to adjust the rotation state of the first fan 21.

The first driving circuit 22 of the first fan module 20 and the second driving circuit 32 of the second fan module 30 detect whether the second terminals P2 of the first fan module 20 and the second fan module 30 are respectively electrically connected to the reference voltage Vref. In the embodiment, the reference voltage Vref is the ground voltage. When the second terminal P2 of the first fan module 20 or the second terminal P2 of the second fan module 30 is electrically connected to the reference voltage Vref, the rotation state of the first fan module 20 or the rotation state of the second fan module 30 is maintained in a first rotation mode. In the embodiment, the second terminal P2 of the first fan module 20 is not electrically connected to the reference voltage Vref, and the second terminal P2 of the second fan module 20 is electrically connected to the reference voltage Vref. Therefore, the rotation state of the second fan module 30 is maintained in the first rotation mode. The first rotation mode indicates that the rotation state of the fan module is maintained at a predetermined rotation frequency, for example, between 3000 RPM±5%. The predetermined rotation frequency can be designed according to practical requirements, and the present disclosure is not limited thereto.

When the second terminal P2 of the first fan module 20 is not electrically connected to the reference voltage, the first fan module 20 is maintained in a normal rotation mode. In the embodiment, the normal rotation mode indicates that the control module 10 provides a control signal to adjust the fan module 20 and the fan module provides a feedback signal to the control module 10. That is, the first fan module 20 works in a closed-loop control manner.

In addition, the second driving circuit 32 of the second fan module 30 further detects whether the rotation state of the second fan 31 is lower than a minimum rotation condition, for example, lower than 300 RPM. In the embodiment, the minimum rotation condition includes a duty cycle or a fan rotation speed of the fan module.

When the rotation state is lower than the minimum rotation condition, the second fan module 30 enters a standby mode. In the embodiment, the standby mode of the fan module means that the fan module is in a stop mode. In the embodiment, the standby mode indicates that the rotation speed of the fan module is in a state of low rotation speed. When the rotation state of the second fan module 30 is not lower than the minimum rotation condition, the second fan module 30 is maintained in the first rotation mode. The first rotation mode indicates that the rotation state of the fan module is maintained at a predetermined rotation frequency, such as 3000 RPM±5%. The predetermined rotation frequency can be designed according to practical requirements, and the present disclosure is not limited thereto.

In addition, the second driving circuit 32 detects whether the second fan module 30 is in an abnormal state. When the second fan module 30 is in the abnormal state, the first terminal P1 of the second fan module 30 is connected to the reference voltage, and the second fan module 30 provides an alarm signal to the first fan module 20, such that the second terminal P2 of the first fan module 20 is connected to the reference voltage. In the embodiment, the reference voltage is the ground voltage.

When the second fan module 30 is in the abnormal state in a period of time, the second driving circuit 32 determines whether the second fan module 30 is in the abnormal state. When the second fan module 30 is determined not in the abnormal state, the second fan module 30 restarts. When the second fan module 30 is determined in the abnormal state, the first terminal P1 of the second fan module 30 is connected to the reference voltage Vref, and provides the alarm signal to the first fan module 20, such that the second terminal P2 of the first fan module 20 is also connected to the reference voltage Vref.

In the embodiment, the second terminal P2 is electrically connected to the second terminal N2 of the control module 10, and is not connected to a specific reference voltage, such as the ground voltage. Therefore, the first driving circuit 22 determines that the first fan module 20 is in a master state, not in a slave state. The master state indicates that the first fan module 20 receives the control signal from the control module 10 to adjust the rotation state thereof.

When the second terminal P2 is connected to the reference voltage, the second fan 31 is determined in a slave state by the second driving circuit 32, namely, the second fan module 30 following the rotation state of the first fan module 20.

In the embodiment, the control module 10 provides a first control signal to the first fan module 20 through the first terminal N1, such that the rotation state of the first fan module 20 is adjusted by the control module 10. Furthermore, the first fan module 20 provides a second control signal to the second fan module 30 to adjust the second fan module through the second terminal P2. In the embodiment, the first control signal and the second control signal are similar.

In other embodiments, the first control signal and the second control signal are different. The first fan module 20 can adjust the first control signal to generate a new second control signal that is different from the original first control signal from the control module 10, or transmits the original first control signal to the second fan module 30, in which the first control signal is considered as the second control signal. In other words, the second control signal and the first control signal can be different or similar, and the present disclosure is not limited thereto.

The second fan module 30 is adjusted by the first fan module 20 according to the second control signal from the first fan module 20. When the second fan module 20 is in the abnormal state, such as an over-temperature state or a lock state, the second terminal P2 of the second fan module 30 is electrically connected to the ground voltage, and provides the alarm signal to the first fan module 20, such that the second terminal P2 of the first fan module 20 is electrically connected to the reference voltage Vref. In the embodiment, the reference voltage Vref is a ground voltage.

[The Embodiment of Fan Control Method]

Figure 2:
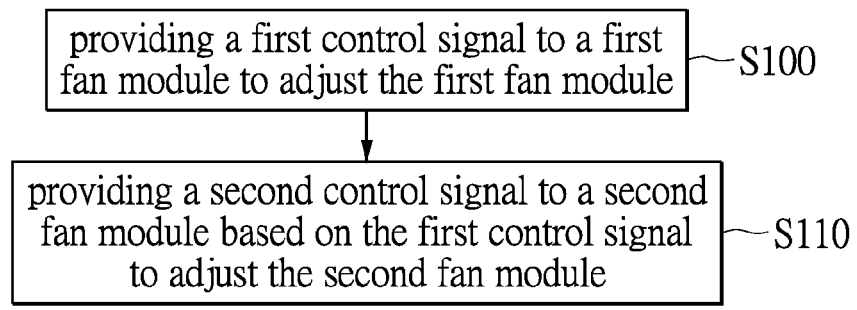
FIG. 2 is a flow chart of a fan control method of an embodiment of the present disclosure.

Reference is made to FIG. 2. In the embodiment, a fan control method includes the following steps: providing a first control signal to a first fan module to adjust the first fan module (step S100); and providing a second control signal to a second fan module based on the first control signal to adjust the second fan module (step S110).

In step S100, a control module 10 provides a fan control signal to the first fan module 20. In step S110, the first fan module 20 provides a second control signal to the second fan module 30 based on the first control signal. In the embodiment, the first fan control signal and the second control signal are pulse width modulation signals (PWM). The first fan module can adjust the first control signal to generate a new second control signal that is different from the original first control signal from the control module 10, or transmits the original first control signal to the second fan module 30, in which the first control signal is considered as the second control signal. In other words, the second control signal and the first control signal can be different or similar, and the present disclosure is not limited thereto.

Figure 3:
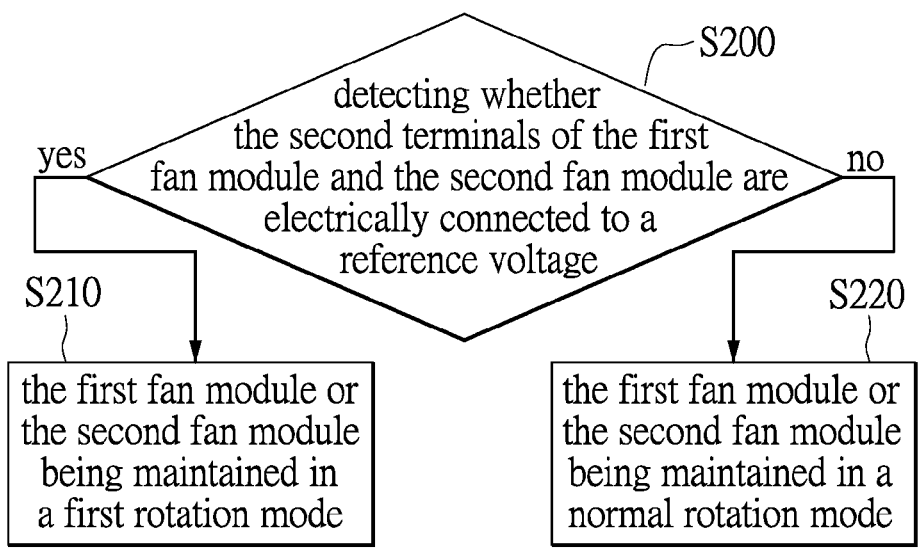
FIG. 3 is another flow chart of a fan control method of an embodiment of the present disclosure.

Referring to FIG. 3, before step S100, the control method further includes: detecting whether the second terminals of the first fan module and the second fan module are electrically connected to a reference voltage (step S200); the first fan module or the second fan module being maintained in a first rotation mode (step S210); and the first fan module or the second fan module being maintained in a normal rotation mode (step S220).

In step S200 and step S210, the first fan module 20 detects whether the second terminal P2 of the first fan module 20 is electrically connected to a reference voltage Vref, and the second fan module 30 also detects whether the second terminal P2 of the second fan module 30 is electrically connected to the reference voltage Vref. In the embodiment, the reference voltage Vref is a ground voltage. When the second terminal of the first fan module 20 or the second fan module 30 is electrically connected to the reference voltage Vref, the first fan module 20 or the second fan module 30 which is electrically connected to the reference voltage Vref is maintained in a first rotation state. In the embodiment, the second terminal P2 of the first fan module 20 is not electrically connected to the reference voltage Vref, but the second terminal P2 of the second fan module 30 is electrically connected to the reference voltage Vref Therefore, the second fan module 30 is maintained in the first rotation mode. The first rotation mode indicates that the rotation state of fan module is maintained at predetermined rotation frequency, such as 3000 RPM±5%.

In step S220, because the second terminal P2 of the first fan module 20 is not electrically connected to the reference voltage Vref, the first fan module 20 is maintained in a normal rotation mode. In the embodiment, the normal rotation mode indicates that the first fan module receives the first control signal from the control module 10 to adjust the rotation mode, and provides a feedback signal to the control module 10.

Figure 4:
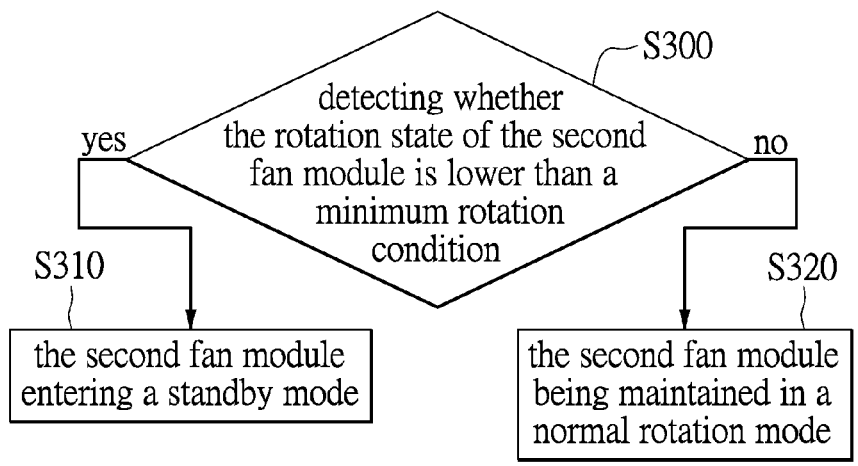
FIG. 4 is another flow chart of a fan control method of an embodiment of the present disclosure.

Referring to FIG. 4, in the embodiment, the fan control method further includes the following steps: detecting whether the rotation state of the second fan module is lower than a minimum rotation condition (step S300); the second fan module entering a standby mode (step S310); and the second fan module being maintained in a normal rotation mode (step S320).

The second driving circuit 32 of the second fan module 30 detects whether the rotation state of the second fan 31 of the second fan module 30 is lower than a minimum rotation condition. The minimum rotation condition includes a duty cycle or a fan rotation speed. In other words, the second fan module 30 is determined whether its rotation speed is lower than the minimum rotation condition, such as 300 RPM.

When the rotation state of the second fan module 30 is lower than the minimum rotation condition, the second fan module 30 enters a standby mode. In the embodiment, the standby mode indicates that the fan module is in a stop mode. In other embodiments, the standby mode can be the fan module in a state of low rotation speed, such as 100 RPM.

When the rotation state of the second fan module 30 is not lower than the minimum rotation condition, the second fan module is maintained in a first rotation mode. The first rotation mode indicates that the rotation state of the fan module is at a predetermined rotation frequency, such as 3000 RPM±5%.

Figure 5:
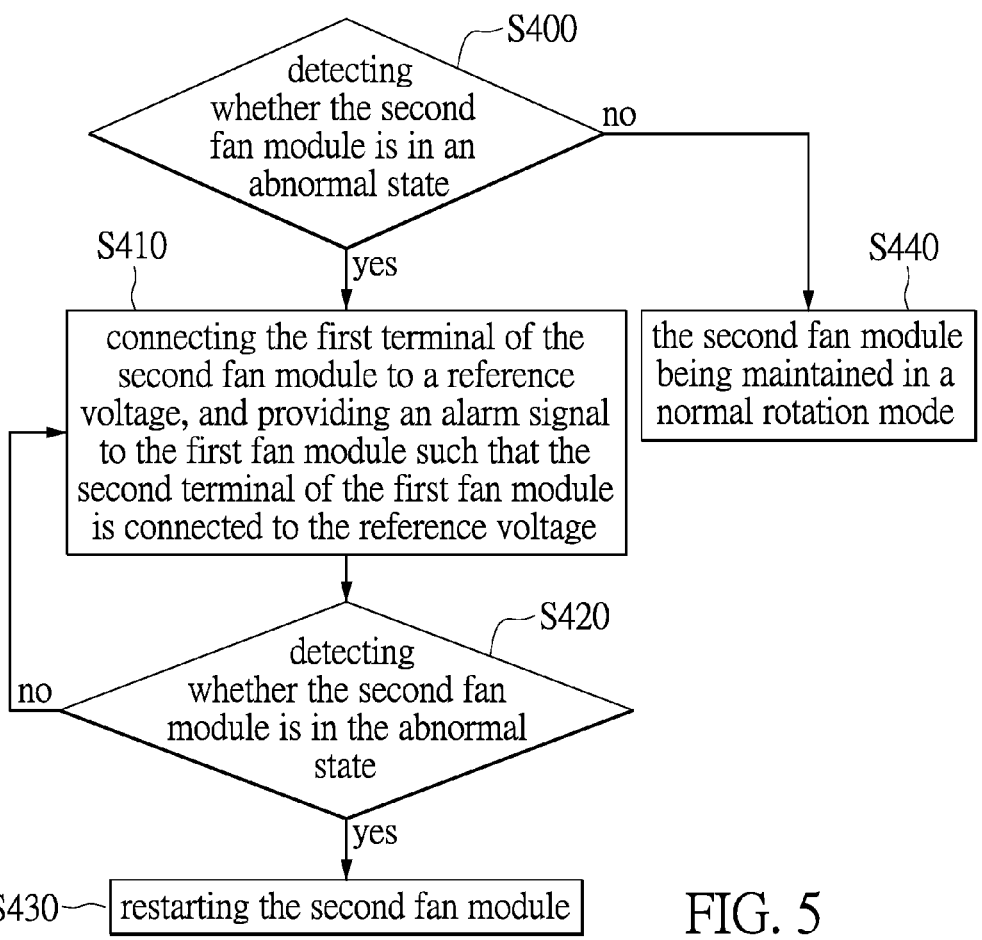
FIG. 5 is another flow chart of a fan control method of an embodiment of the present disclosure.

Referring to FIG. 5, the fan control method further includes the following steps: detecting whether the second fan module is in an abnormal state (step S400); connecting the first terminal of the second fan module to a reference voltage, and providing an alarm signal to the first fan module such that the second terminal of the first fan module is connected to the reference voltage (step S410); detecting whether the second fan module is in the abnormal state (step S420); restarting the second fan module (step S430); and the second fan module being maintained in a normal rotation mode (step S440).

In step S400, the second driving circuit 32 detects whether the second fan module is in an abnormal state. When the second fan module 30 is in the abnormal state, step S410 is executed. In other words, the first terminal P1 of the second fan module 30 is connected to the reference voltage Vref, and an alarm signal is provided to the first fan module 20, such that the second terminal P2 of the first fan module 20 is also connected to the reference voltage Vref. When the second fan module 30 is not in the abnormal state, step S440 is executed, and the second fan module 30 is maintained in the first rotation mode.

When the abnormal state lasts for a period of time, step S420 is executed. The second driving circuit 32 determines whether the second fan module 30 is in the abnormal state. When the second fan module 30 is determined not in the abnormal state, step S430 is executed to restart the second fan module 30. When the second fan module 30 is determined in the abnormal state, step S410 is executed.

According to the above, the fan control system and the fan control method of the present disclosure can effectively control the first fan module and the second fan module to stop or to start to operate at the same time. The first fan module and second fan module can also have the same rotation speed. When the second fan module is in the abnormal state, the control module can immediately detect the abnormal state of the second fan module, and provides an alarm signal. Therefore, the fan system can operate simultaneously, and the cost is reduced.

The above-mentioned descriptions represent merely the exemplary embodiments of the instant disclosure, without any intention to limit the scope of the instant disclosure thereto. Various equivalent changes, alterations or modifications based on the claims of present disclosure are all consequently viewed as being embraced by the scope of the instant disclosure.

What is claimed is:

1. A fan control system comprising:
    a control module;
    a first fan module electrically connected to the control module; and
    a second fan module electrically connected to the control module;
    wherein the control module provides a first control signal to the first fan module to adjust a rotation state of the first fan module, the first fan module provides a second control signal to the second fan module based on the first control signal to adjust the second fan module;
    wherein the first fan module includes a first terminal and a second terminal, the second fan module includes a first terminal and a second terminal, the first terminal of the first fan module is electrically connected to the control module to receive the first control signal, the second terminal of the first fan module is electrically connected to the first terminal of the second fan module, the second terminal of the second fan module is electrically connected to a reference voltage.

2. The fan control system of claim 1, wherein the first control signal is the same as the second control signal.

3. The fan control system of claim 1, wherein the first control signal and the second control signal are different.

4. The fan control system of claim 1, wherein the reference voltage is a ground voltage.

5. A fan control method, comprising:
    providing a first control signal to a first fan module to adjust the first fan module; and
    providing a second control signal to a second fan module to adjust the second fan module, wherein the second control signal is generated based on the first control signal;
    wherein the first fan module includes a first terminal and a second terminal, the second fan module includes a first terminal and a second terminal, the first terminal of the first fan module is electrically connected to the control module to receive the first control signal, the second terminal of the first fan module is electrically connected to the first terminal of the second fan module, the second terminal of the second fan module is electrically connected to a reference voltage.

6. The fan control method of claim 5, wherein the first control signal is the same as the second control signal.

7. The fan control method of claim 5, wherein the first control signal and the second control signal are different.

8. The fan control method of claim 5, before the step of providing the first control signal to the first fan module, the fan control method further comprising:
    detecting whether the second terminal of the first fan module and the second terminal of the second fan module are respectively electrically connected to a reference voltage;
    when the second terminal of the first fan module and the second terminal of the second fan module are electrically connected to the reference voltage, the first fan module and the second fan module being maintained in a first rotation mode; and
    when the second terminal of the first fan module and the second terminal of the second fan module are not electrically connected to the reference voltage, the first fan module and the second fan module being maintained in a normal rotation mode.

9. The fan control method of claim 5, further comprising:
    detecting whether a rotation state of the second fan module is lower than a minimum rotation condition;
    when the rotation state of the first fan module and the second fan module is lower than the minimum rotation condition, the second fan module entering a standby mode; and
    when the rotation state of the first fan module and the second fan module is not lower than the minimum rotation condition, the second fan module being maintained in the first rotation mode.

10. The fan control method of claim 5, further comprising:
    detecting whether the second fan module is in an abnormal state; and
    when the second fan module is in an abnormal state, the first terminal of the second fan module being electrically connected to a reference voltage and an alarm signal being provided to the first fan module, such that the second terminal of the first fan module is electrically connected to the reference voltage.

11. The fan control method of claim 10, further comprising:
    determining whether the second fan module is in the abnormal state; and
    when the second fan module is determined not in the abnormal state, restarting the second fan module.

12. The fan control method of claim 5, wherein the reference voltage is a ground voltage.

* * * * *